US010474981B1

(12) United States Patent
Mossoba et al.

(10) Patent No.: US 10,474,981 B1
(45) Date of Patent: *Nov. 12, 2019

(54) UTILIZING MACHINE LEARNING TO GENERATE AUGMENTED REALITY DELIVERY INSTRUCTIONS FOR DELIVERING AN ITEM TO A LOCATION

(71) Applicant: Capital One Services, LLC, McLean, VA (US)

(72) Inventors: Michael Mossoba, Arlington, VA (US); Abdelkadar M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,699

(22) Filed: Mar. 22, 2019

Related U.S. Application Data

(63) Continuation of application No. 16/122,476, filed on Sep. 5, 2018, now Pat. No. 10,262,290.

(51) Int. Cl.
G06Q 10/08 (2012.01)
G06F 17/27 (2006.01)
G06K 9/00 (2006.01)
G06F 17/21 (2006.01)
(Continued)

(52) U.S. Cl.
CPC ........... G06Q 10/083 (2013.01); G06F 17/21 (2013.01); G06F 17/2705 (2013.01);
(Continued)

(58) Field of Classification Search
CPC ..... G06Q 10/083; H04W 4/029; G06F 15/18; G06K 9/00671; G06T 19/006
(Continued)

(56) References Cited

U.S. PATENT DOCUMENTS 9,595,115 B1    3/2017  Cederlof et al.
10,262,290 B1*  4/2019  Mossoba .............. G06Q 10/083
(Continued)

OTHER PUBLICATIONS

Cirulis et. al.; "Augmented Reality in Logistics"; ICTE in Regional Development, Dec. 2013; Procedia Computer Science 26 (2013), 14-20; (Year: 2013).*
(Continued)

Primary Examiner — Kevin H Flynn
Assistant Examiner — Emmett K. Walsh
(74) Attorney, Agent, or Firm — Harrity & Harrity, LLP

(57) ABSTRACT

A device receives delivery information indicating instructions for delivery of an item at a location, wherein the delivery information include an image of the location with a designated point for delivering the item. The device receives information indicating that a user device, associated with a delivery person, is at the location, and processes the delivery information and the information indicating that the user device, associated with the delivery person, is at the location, with a machine learning model, to generate delivery instructions for the item, wherein the delivery instructions include augmented reality information indicating the designated point for delivering the item at the location. The device provides the delivery instructions to the user device, wherein the delivery instructions enable the user device to utilize the augmented reality information to display the designated point for delivering the item within a live image of the location.

20 Claims, 13 Drawing Sheets

(51) Int. Cl.
*H04W 4/029* (2018.01)
*G06T 19/00* (2011.01)
*G06N 20/00* (2019.01)

(52) U.S. Cl.
CPC ......... *G06K 9/00671* (2013.01); *G06N 20/00* (2019.01); *G06T 19/006* (2013.01); *H04W 4/029* (2018.02)

(58) Field of Classification Search
USPC ........................................................ 705/330
See application file for complete search history.

(56) References Cited

U.S. PATENT DOCUMENTS

| | | |
|---|---|---|
| 2013/0094693 A1 | 4/2013 | Bolton et al. |
| 2014/0108136 A1 | 4/2014 | Zhao et al. |
| 2014/0267399 A1 | 9/2014 | Zamer et al. |
| 2015/0046296 A1 | 2/2015 | Hart et al. |
| 2015/0199643 A1 | 7/2015 | Hubner et al. |
| 2015/0302495 A1* | 10/2015 | Stuckman ................ G01S 1/00 705/26.35 |
| 2016/0292635 A1 | 10/2016 | Todasco et al. |
| 2018/0121875 A1* | 5/2018 | Satyanarayana Rao ..................... G06Q 10/08355 |

OTHER PUBLICATIONS

Cirulis A., et al., "Augmented Reality in Logistics," Procedia Computer Science, 2013, vol. 26, pp. 14-20.
Co-pending U.S. Appl. No. 16/122,476, filed Sep. 5, 2018.

* cited by examiner

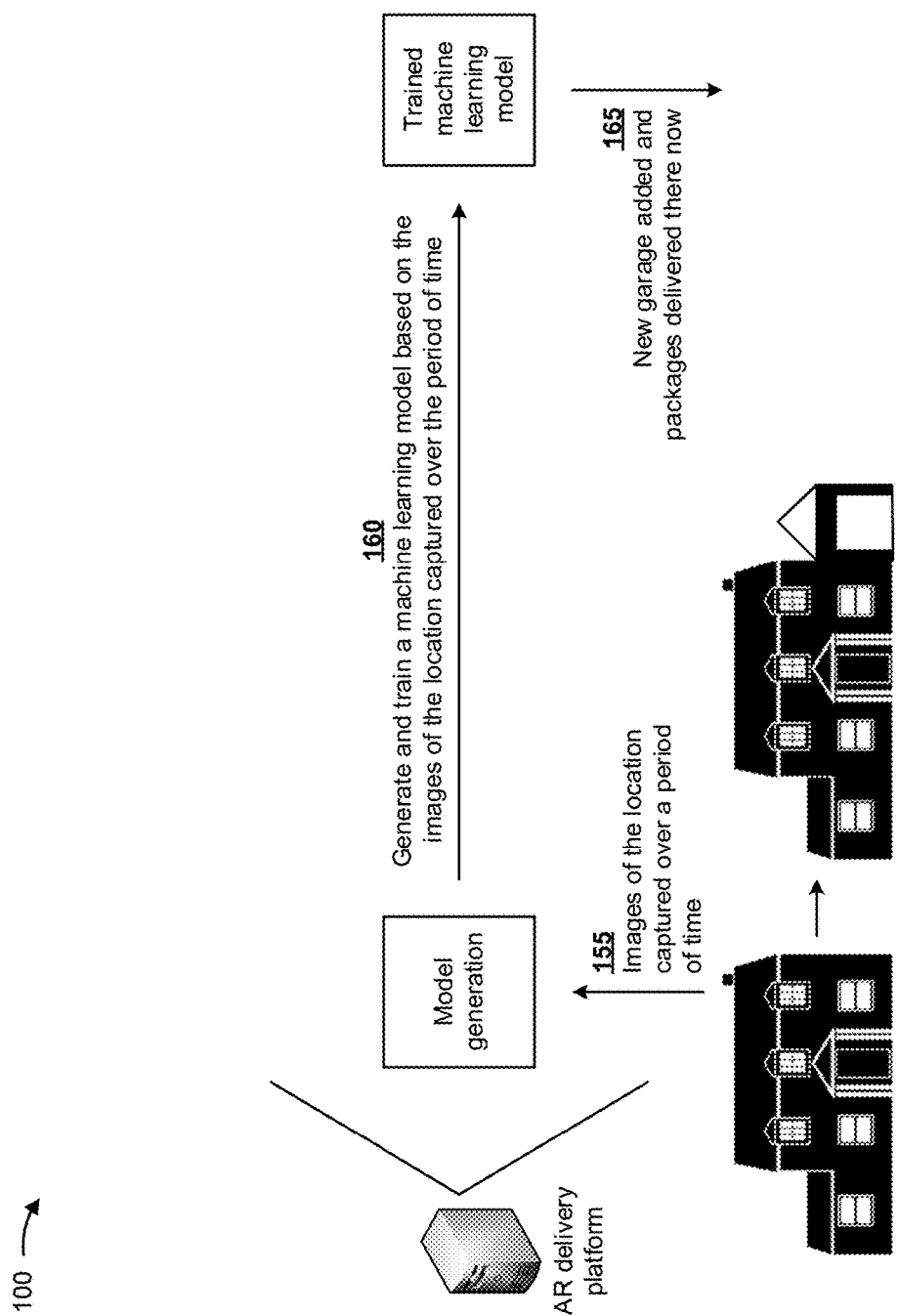

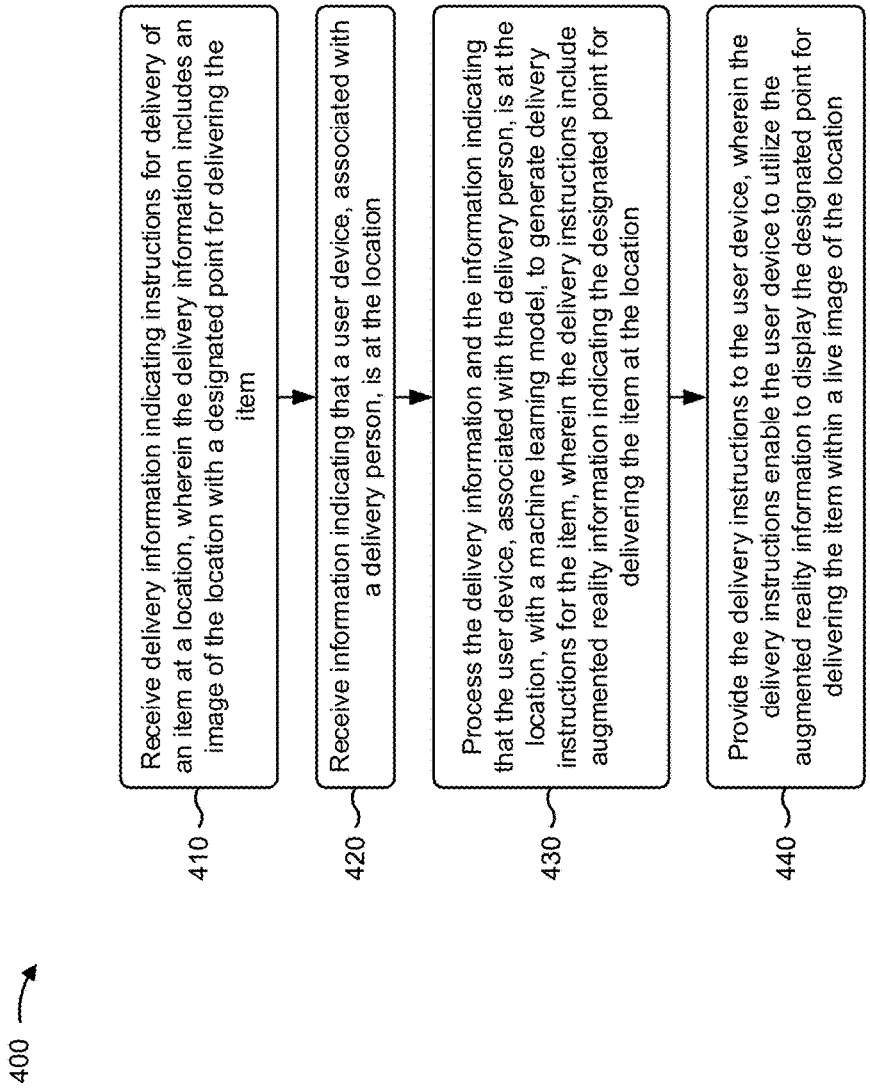

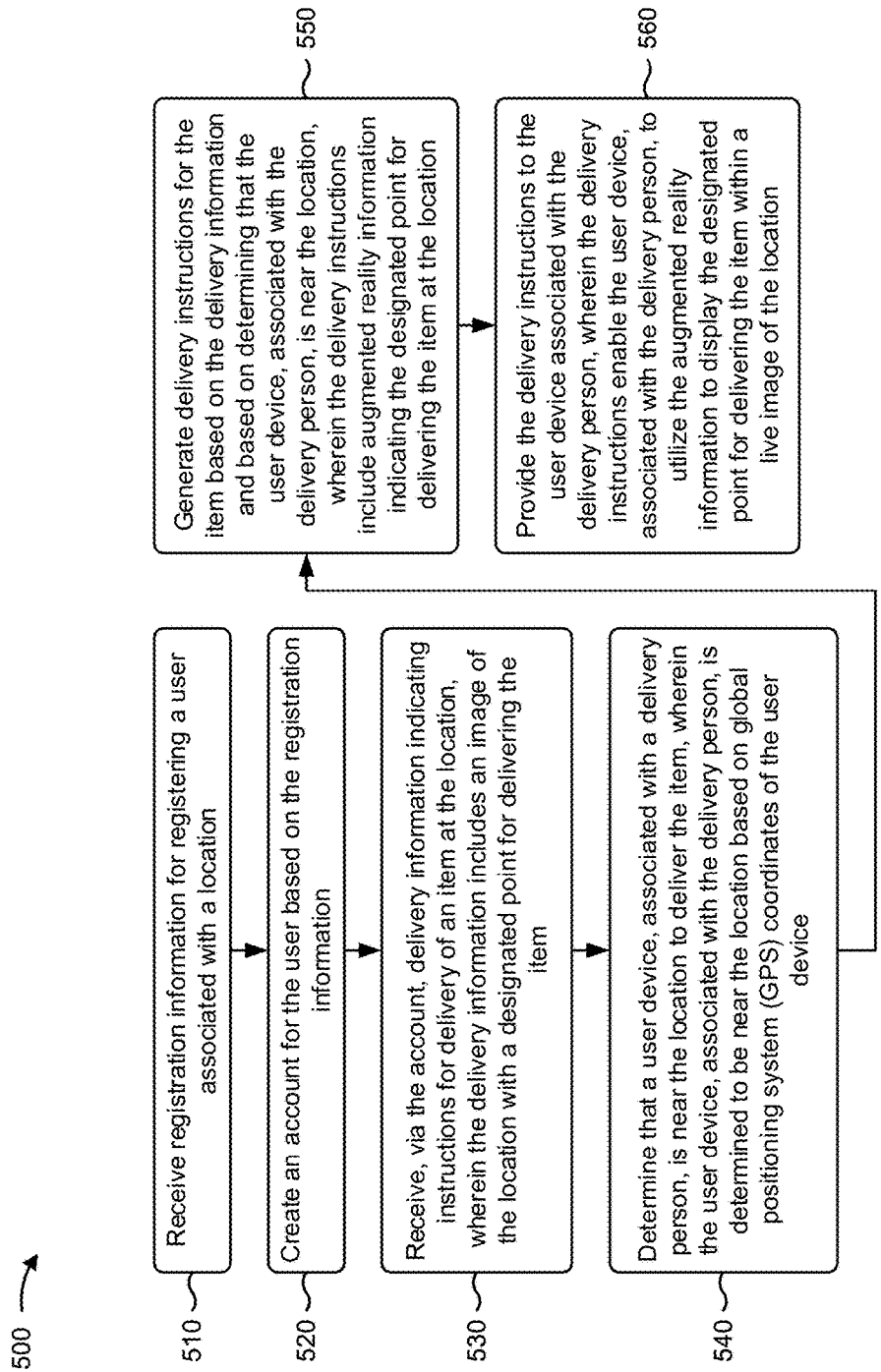

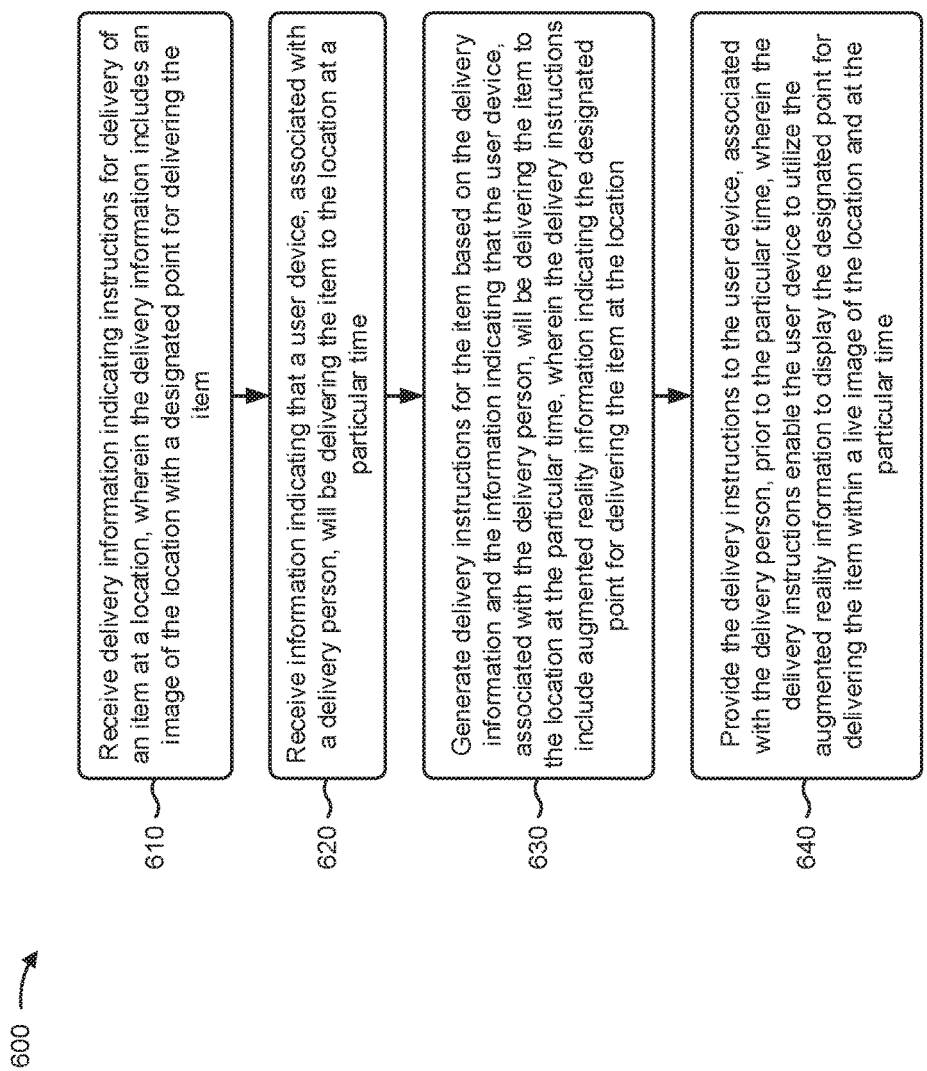

UTILIZING MACHINE LEARNING TO GENERATE AUGMENTED REALITY DELIVERY INSTRUCTIONS FOR DELIVERING AN ITEM TO A LOCATION

RELATED APPLICATION

This application is a continuation of U.S. patent application Ser. No. 16/122,476, filed Sep. 5, 2018, which is incorporated herein by reference.

BACKGROUND

More people than ever are shopping online and having items (e.g., packages) delivered to their homes, workplaces, and/or other locations. Delivery services utilize delivery personnel to deliver the items to the homes, the workplaces, and/or the other locations. If an item does not require a signature from a receiver of the item, the delivery personnel typically leave the item at a front door, in a mailbox, and/or the like.

SUMMARY

According to some implementations, a device may include one or more memories, and one or more processors, communicatively coupled to the one or more memories, to receive delivery information indicating instructions for delivery of an item at a location, wherein the delivery information may include an image of the location with a designated point for delivering the item. The one or more processors may receive information indicating that a user device, associated with a delivery person, is at the location, and may process the delivery information and the information indicating that the user device, associated with the delivery person, is at the location, with a machine learning model, to generate delivery instructions for the item, wherein the delivery instructions may include augmented reality information indicating the designated point for delivering the item at the location. The one or more processors may provide the delivery instructions to the user device, wherein the delivery instructions may enable the user device to utilize the augmented reality information to display the designated point for delivering the item within a live image of the location.

According to some implementations, a non-transitory computer-readable medium may store instructions that include one or more instructions that, when executed by one or more processors of a device, cause the one or more processors to receive registration information for registering a user associated with a location, and create an account for the user based on the registration information. The one or more instructions may cause the one or more processors to receive, via the account, delivery information indicating instructions for delivery of an item at the location, wherein the delivery information may include an image of the location with a designated point for delivering the item. The one or more instructions may cause the one or more processors to determine that a user device, associated with a delivery person, is near the location to deliver the item, wherein the user device, associated with the delivery person, may be determined to be near the location based on global positioning system (GPS) coordinates of the user device. The one or more instructions may cause the one or more processors to generate delivery instructions for the item based on the delivery information and based on determining that the user device, associated with the delivery person, is near the location, wherein the delivery instructions may include augmented reality information indicating the designated point for delivering the item at the location. The one or more instructions may cause the one or more processors to provide the delivery instructions to the user device associated with the delivery person, wherein the delivery instructions may enable the user device, associated with the delivery person, to utilize the augmented reality information to display the designated point for delivering the item within a live image of the location.

According to some implementations, a method may include receiving delivery information indicating instructions for delivery of an item at a location, wherein the delivery information may include an image of the location with a designated point for delivering the item. The method may include receiving information indicating that a user device, associated with a delivery person, will be delivering the item to the location at a particular time, and generating delivery instructions for the item based on the delivery information and the information indicating that the user device, associated with the delivery person, will be delivering the item to the location at the particular time, wherein the delivery instructions may include augmented reality information indicating the designated point for delivering the item at the location. The method may include providing the delivery instructions to the user device, associated with the delivery person, prior to the particular time, wherein the delivery instructions may enable the user device to utilize the augmented reality information to display the designated point for delivering the item within a live image of the location and at the particular time.

BRIEF DESCRIPTION OF THE DRAWINGS

FIGS. 1A-1H are diagrams of an example implementation described herein.

FIGS. 4-6 are flow charts of example processes for utilizing machine learning to generate augmented reality delivery instructions for delivering an item to a location.

DETAILED DESCRIPTION

The following detailed description of example implementations refers to the accompanying drawings. The same reference numbers in different drawings may identify the same or similar elements.

The increase in the quantity of packages being delivered has caused an increase in a quantity of thefts of packages from homes, workplaces, and/or other locations. One way to reduce theft of an item is to require a physical signature from a recipient of the item. However, this may be impractical or impossible when the recipient is not at a delivery location when the package is scheduled to be delivered (e.g., in the day time). Thus, delivery services currently do not provide a practical, safe, and convenient way of ensuring delivery of items to customers.

Some implementations described herein provide an augmented reality (AR) delivery platform that utilizes machine learning to generate augmented reality delivery instructions for delivering an item to a location. For example, the AR delivery platform may receive delivery information indicating instructions for delivery of an item at a location, wherein the delivery information may include an image of the location with a designated point for delivering the item. The AR delivery platform may receive information indicating that a user device, associated with a delivery person, is at the location, and may process the delivery information and the information indicating that the user device, associated with the delivery person, is at the location, with a machine learning model, to generate delivery instructions for the item, wherein the delivery instructions may include augmented reality information indicating the designated point for delivering the item at the location. The AR delivery platform may provide the delivery instructions to the user device, wherein the delivery instructions may enable the user device to utilize the augmented reality information to display the designated point for delivering the item within a live image of the location.

In this way, the AR delivery platform provides a practical, safe, and convenient way of ensuring delivery of items to customers. The AR delivery platform may provide augmented reality information that ensures delivery of an item to a location designated by a customer, which may prevent theft, vandalism, and/or destruction of the item and may reduce ambiguity (e.g., for a delivery person) of where to deliver an item. By ensuring delivery of items to customers, the AR delivery platform may conserve resources (e.g., processing resources, memory resources, transportation resources, manufacturing resources, and/or like) that would otherwise be used to replace stolen, vandalized, and/or destroyed items.

Figure 1A:
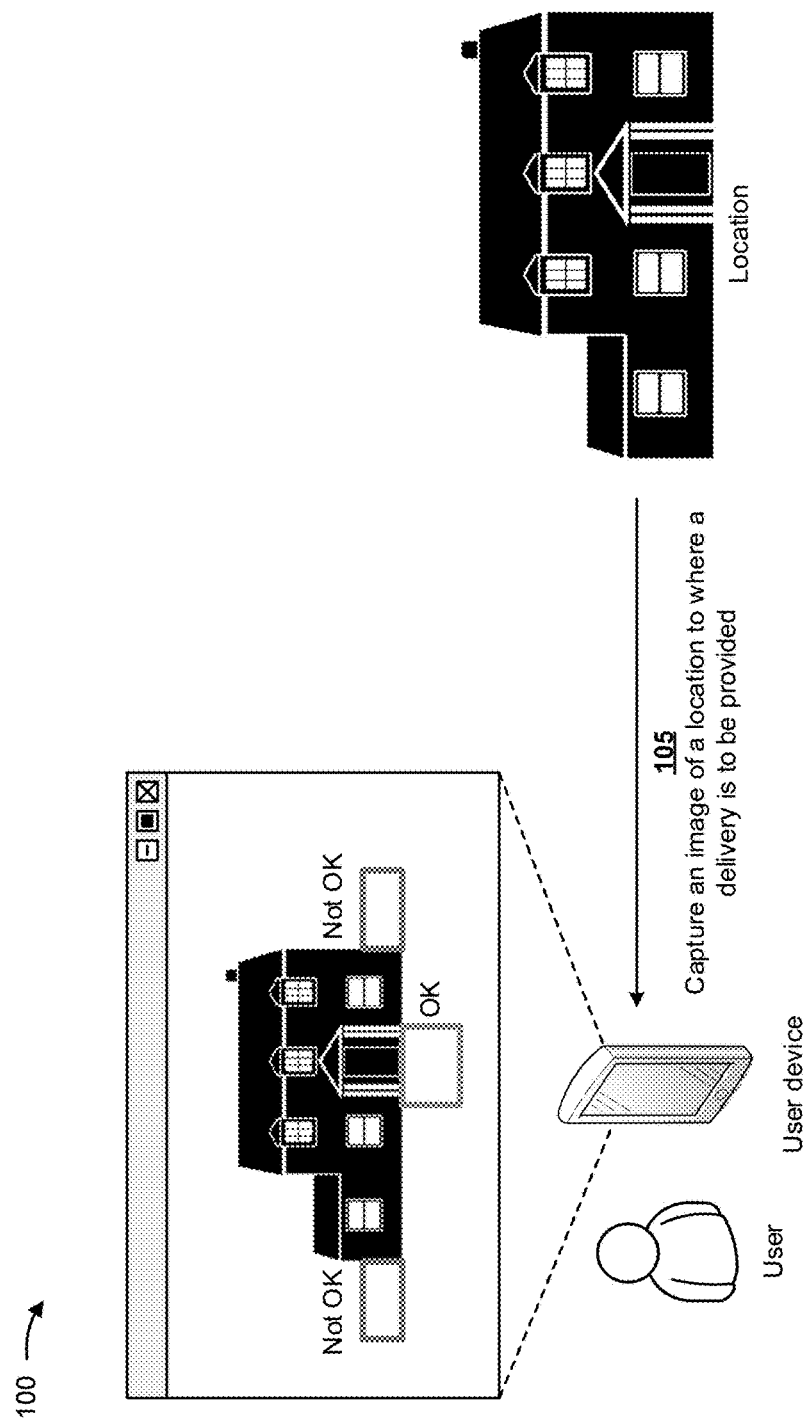

FIGS. 1A-1H are diagrams of an example implementation 100 described herein. As shown in FIGS. 1A-H, a user device, associated with a user (e.g., a customer, such as a home owner, a property manager, a delivery service, etc.), and another user device, associated with a delivery person, may be associated with an augmented reality (AR) delivery platform. As shown in FIG. 1A, the user of the user device may be associated with a location (e.g., a home of the user). As further shown in FIG. 1A, and by reference number 105, the user of the user device may utilize the user device to capture an image of the location to where a delivery is to be provided (e.g., at a later time).

In some implementations, the user may utilize the user device to provide instructions for delivery of items at the location, such as instructions to provide an item in a mailbox at the location, at a front door of the location, behind a screen door, on a porch of the location, behind a plant (e.g., a bush) at the location, within a lobby of the location, at a back door of the location, instructions to ring a doorbell and leave the item at a front door if no one answers the doorbell, and/or the like. In some implementations, as further shown in FIG. 1A, the user may utilize the user device to provide indications (e.g., circles, points, squares, other shapes, colors, and/or the like), in the image of the location, that identify one or more designated points (e.g., squares marked "OK") for delivering an item at the location, one or more designated points (e.g., squares marked "Not OK") not to leave an item at the location, and/or the like. In some implementations, such indication may be provided based on the user walking to designated points at the location and indicating whether a point is approved or not approved for delivering an item. In some implementations, the user device may utilize the instructions for delivery of items at the location to automatically create the indications in the image of the location. For example, if the user provides instructions indicating that an item is to be delivered to a side porch at the location, the user device may provide an indication at an image of the side porch in the image of the location.

In some implementations, the user may utilize the user device to receive an application from the AR delivery platform, and may install the application on the user device. The application may enable the user device to capture the image of the location, receive the instructions for delivery of items at the location from the user, receive the indications, in the image of the location, that identify one or more designated points for delivering an item at the location, automatically create the indications in the image of the location, and/or the like.

Figure 1B:
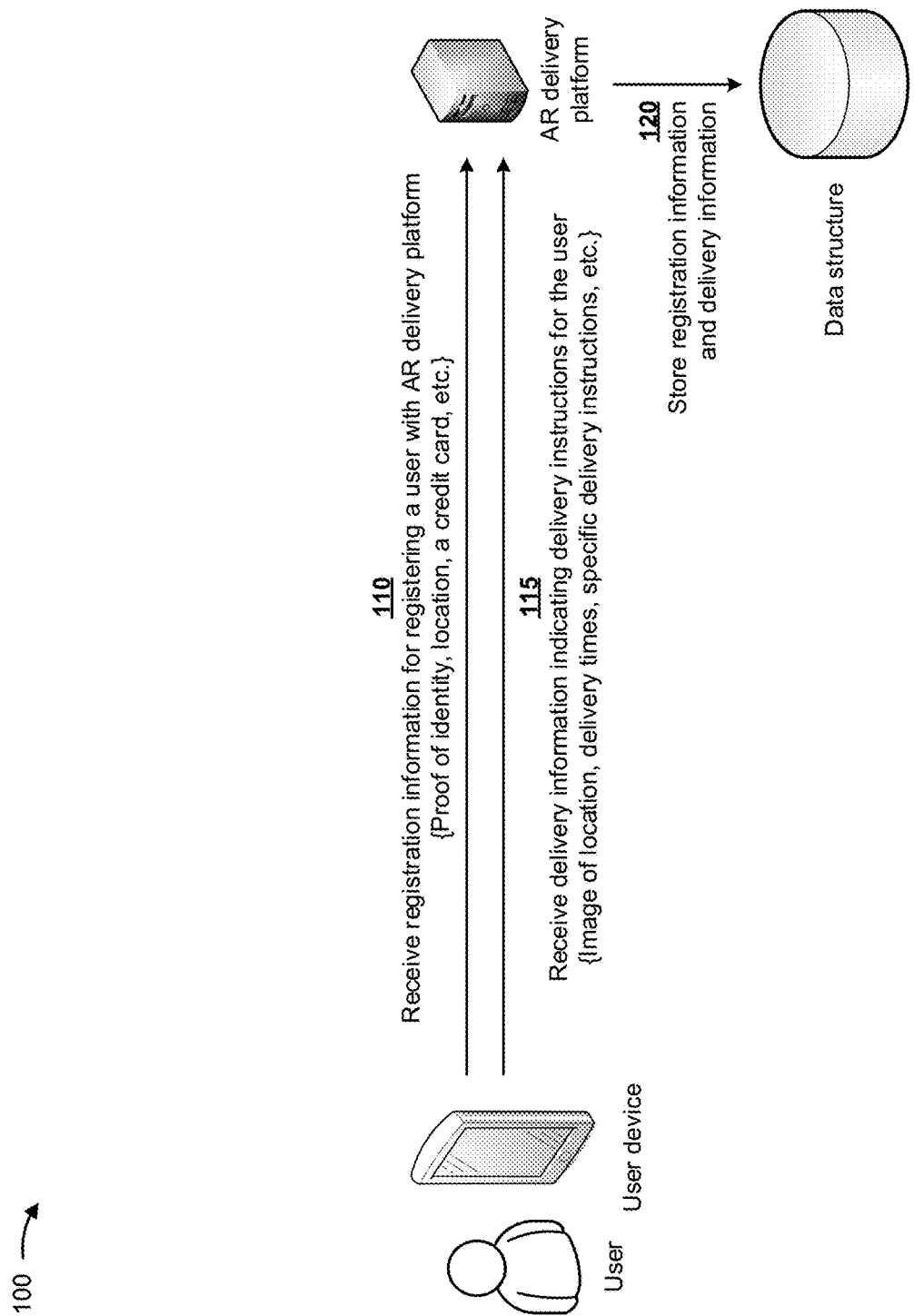

As shown in FIG. 1B, and by reference number 110, the AR delivery platform may receive, from the user device, registration information for registering the user with the AR delivery platform. In some implementations, the registration information may include information indicating proof of an identity of the user (e.g., a name of the user, a home address of the user, an email address of the user, a driver's license number of the user, and/or the like); information indicating the location of the user (e.g., a home address of the user, global positioning system (GPS) coordinates of the user device, an image of mail indicating the location, and/or the like); information indicating a method of payment for utilizing the AR delivery platform if payment is required (e.g., a credit card number, a debit card number, and/or the like); and/or the like.

In some implementations, the AR delivery platform may validate that the registration information is correct (e.g., that the user is properly identified, that the location of the user is verified and associated with the user, that the method of payment is valid, and/or the like), and may register the user with the AR delivery platform when the registration information is correct. If the registration information is not correct, the AR delivery platform may reject the request for registering the user with the AR delivery platform. In some implementations, when the user is registered with the AR delivery platform, the AR delivery platform may provide the application to the user device (e.g., for capturing the image of the location, receiving the instructions for delivery of items at the location from the user, receiving the indications, automatically creating the indications, and/or the like), as described above in connection with FIG. 1A.

As further shown in FIG. 1B, and by reference number 115, the AR delivery platform may receive, from the user device, delivery information indicating delivery instructions for the user (e.g., for delivering items to the location). In some implementations, the user may utilize the application to cause the user device to provide the delivery information to the AR delivery platform. In some implementations, the delivery information may include the image of the location; information indicating preferred delivery times to the location; information indicating specific delivery instructions (e.g., ring a doorbell, knock on a back door, and/or the like); the instructions for delivery of items at the location; the indications, in the image of the location, that identify one or more designated points for delivering an item at the location; the automatically created indications in the image of the location; and/or the like. In some implementations, the delivery instructions may be different for different sized items. For example, a letter may be placed in a mailbox or inside a screen door, while a medium or large package will need to be left at a different location (e.g., on a front porch).

As further shown in FIG. 1B, and by reference number 120, the AR delivery platform may store the registration information and the delivery information in a data structure (e.g., a database, a table, a list, and/or the like) associated with the AR delivery platform. In some implementations, the AR delivery platform may utilize the registration information and the delivery information stored in the data structure to compare with a request for a delivery of an item, identify the user as being associated with the request, determine delivery instructions for the item, and/or the like, as described below. For example, assume that the user orders goods (e.g., provided in a package) from an online company, and the online company provides the package to a delivery service that utilizes the AR delivery platform.

Figure 1C:
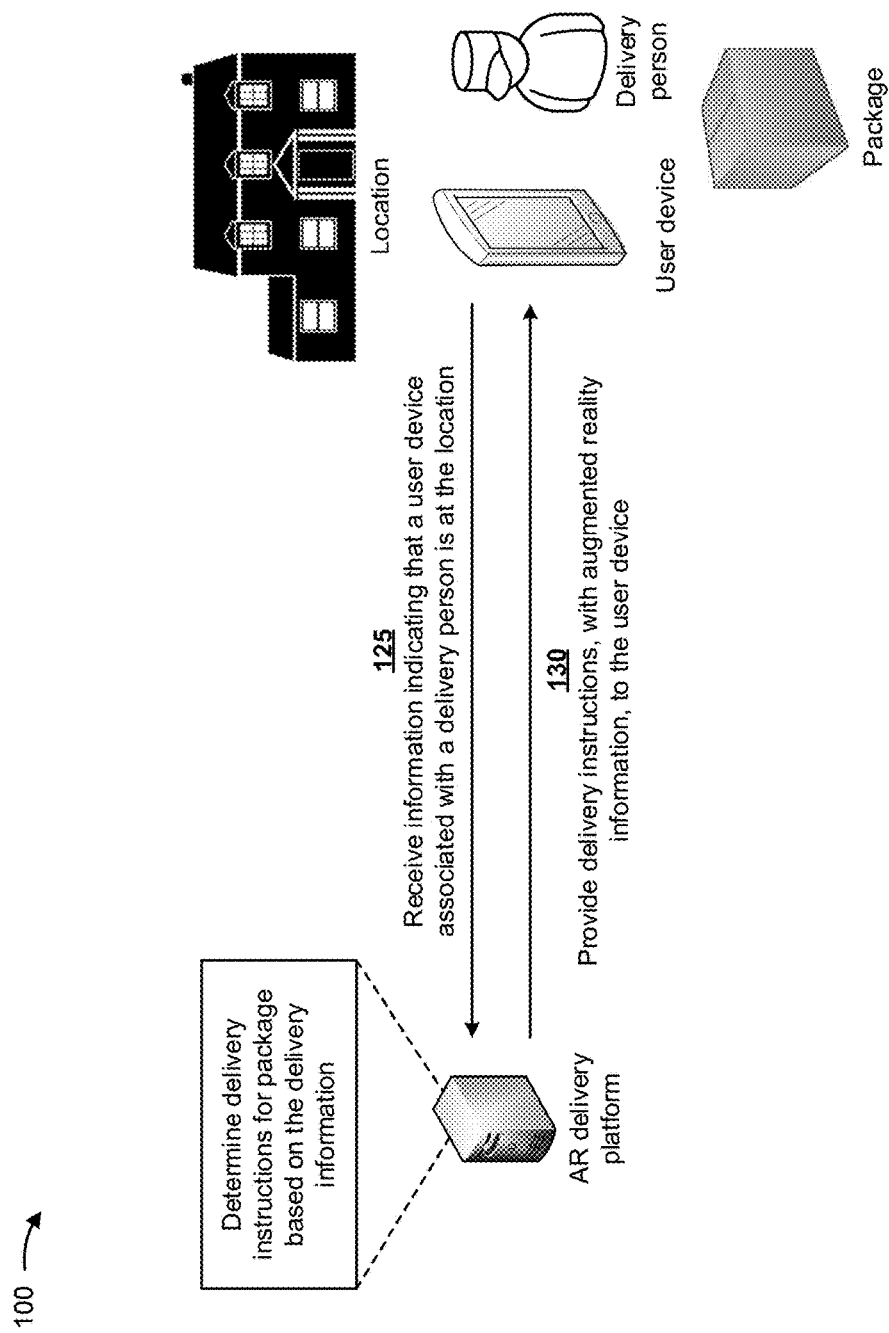

As shown in FIG. 1C, and by reference number 125, the AR delivery platform may receive, from the user device (e.g., an AR mobile device, AR glasses, and/or the like) associated with the delivery person (e.g., of the delivery service), information indicating that the user device associated with the delivery person is at the location. In some implementations, the user device associated with the delivery person may include an application (e.g., received from the AR delivery platform) that causes the user device to provide, to the AR delivery platform, the information indicating that the user device is at the location and to perform functions described below. In some implementations, the user device may automatically provide, to the AR delivery platform, the information indicating that the user device is at the location when GPS coordinates of the user device match GPS coordinates associated with the location. In some implementations, the user device may automatically provide, to the AR delivery platform, GPS coordinates of the user device, and the AR delivery platform may determine that the user device is at the location when the GPS coordinates of the user device match the GPS coordinates associated with the location.

In some implementations, the user device may automatically provide, to the AR delivery platform, images of an area around the user device. In such implementations, the AR delivery platform may determine that the user device is at the location when the images of the area include an image of the location. For example, the AR delivery platform may analyze the images of the area to identify an address number of the location (e.g., multiple address numbers may be associated with a single building in multi-tenant buildings), may determine that the images include the address (e.g., house number 125) when images show a house between house number 123 and house number 127, may analyze images of mailboxes or a curb to identify the address number of the location, and/or the like.

In some implementations, the delivery person may utilize the user device to capture an image of a shipping label associated with an item (e.g., a coded label, a label with an address, and/or the like), and may determine a location for the item based on the image (e.g., via optical character recognition and natural language processing, via bar code reader application, and/or the like). For example, the user device may determine which item is being delivered at any given time in order to narrow an item to a specific location (e.g., when delivering items to multiple townhouses together).

As further shown in FIG. 1C, the AR delivery platform may determine delivery instructions for the package based on the delivery information (e.g., stored in the data structure) and based on receiving the information indicating that the user device associated with the delivery person is at the location. In some implementations, the AR delivery platform may map the information indicating that the user device associated with the delivery person is at the location with the delivery information associated with the location, and may generate the delivery instructions based on the mapped delivery information (e.g., the delivery information provided by the user in FIG. 1B). In some implementations, the delivery instructions may include augmented reality information, the image of the location, information indicating preferred delivery times to the location, information indicating specific delivery instructions, the indications that identify one or more designated points for delivering an item at the location, the indications that identify one or more designated points not to leave an item at the location, the automatically created indications in the image of the location, and/or the like. In some implementations, the delivery person may indicate, to the AR delivery platform, what is being delivered (e.g., a size of an item, such as measurements of a package), and the AR delivery platform may determine the delivery instructions based on this additional information. In some implementations, the augmented reality information may include the image of the location, the indications that identify one or more designated points for delivering an item at the location, the indications that identify one or more designated points not to leave an item at the location, and/or the like.

In some implementations, the AR delivery platform may process the delivery information associated with the location and the information indicating that the user device, associated with the delivery person, is at the location, with a machine learning model, to generate the delivery instructions for the package. In some implementations, the machine learning model may include a pattern recognition model that generates the delivery instructions for the package. For example, if the delivery information does not indicate a designated point for delivery, the machine learning model may automatically select or recommend (e.g., to the user) a designated point for delivery at the location. In another example, if the delivery information indicates a designated point for delivery, the machine learning model may determine whether the designated point for delivery is a best point for delivery (e.g., due to thefts near the location at such designated points), and may recommend one or more designated points for delivery to the user.

In some implementations, the AR delivery platform may perform a training operation on the machine learning model with historical delivery information associated with a geographical area that includes the location. The historical delivery information may include information indicating delivery instructions for locations within the geographical area (e.g., if the location is a house, the geographical area may include a neighborhood that includes the house), information indicating designated points of delivery at the locations within the geographical area (e.g., most houses in the neighborhood have packages left at the front door), information indicating theft, vandalism, and/or destruction of packages at the designated points of delivery at the locations within the geographical area, and/or the like. In some implementations, the historical delivery information may include information associated with other geographical areas.

The AR delivery platform may separate the historical delivery information associated with the geographical area into a training set, a validation set, a test set, and/or the like. In some implementations, the AR delivery platform may train the machine learning model using, for example, an unsupervised training procedure and based on the historical delivery information associated with the geographical area. For example, the AR delivery platform may perform dimensionality reduction to reduce the historical delivery information associated with the geographical area to a minimum feature set, thereby reducing resources (e.g., processing resources, memory resources, and/or the like) to train the machine learning model, and may apply a classification technique, to the minimum feature set.

In some implementations, the AR delivery platform may use a logistic regression classification technique to determine a categorical outcome (e.g., that the historical delivery information associated with the geographical area indicate that certain designated points are ideal for item delivery). Additionally, or alternatively, the AR delivery platform may use a naïve Bayesian classifier technique. In this case, the AR delivery platform may perform binary recursive partitioning to split the historical delivery information associated with the geographical area into partitions and/or branches, and use the partitions and/or branches to perform predictions (e.g., that the historical delivery information associated with the geographical area indicate that certain designated points are ideal for item delivery). Based on using recursive partitioning, the AR delivery platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the AR delivery platform may use a support vector machine (SVM) classifier technique to generate a non-linear boundary between data points in the training set. In this case, the non-linear boundary is used to classify test data into a particular class.

Additionally, or alternatively, the AR delivery platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the AR delivery platform may use one or more other model training techniques, such as a neural network technique, a latent semantic indexing technique, and/or the like. For example, the AR delivery platform may perform an artificial neural network processing technique (e.g., using a two-layer feedforward neural network architecture, a three-layer feedforward neural network architecture, and/or the like) to perform pattern recognition with regard to patterns of the historical delivery information associated with the geographical area. In this case, using the artificial neural network processing technique may improve an accuracy of the trained machine learning model generated by the AR delivery platform by being more robust to noisy, imprecise, or incomplete data, and by enabling the AR delivery platform to detect patterns and/or trends undetectable to human analysts or systems using less complex techniques.

In some implementations, when no delivery information is provided for a location, the delivery person may utilize the user device to capture an image of the location and to identify a designated point of the package in the image. The delivery person may provide the image of the location and the designated point of the package in the image to the AR delivery platform. The AR delivery platform may process the image of the location and the designated point of the package in the image, with the machine learning model, to generate augmented reality information or non-augmented reality information that may be utilized by a receiver of the package (e.g., the homeowner) to retrieve the package at the location.

As further shown in FIG. 1C, and by reference number 130, the AR delivery platform may provide the delivery instructions, with the augmented reality information, to the user device associated with the delivery person. The user device may receive the delivery instructions and the augmented reality information, and the delivery instructions and the augmented reality information may enable the delivery person to deliver the package to an appropriate point at the location. In some implementations, prior to traveling to the location, the AR delivery platform may provide the delivery instructions, with the augmented reality information, to the user device if the user device indicates specific delivery locations to be performed by the delivery person. For example, if the delivery person is making ten deliveries to locations, the delivery person may cause the user device to provide information associated with the ten deliveries (e.g., locations, order of the deliveries, and/or the like) to the AR delivery platform. As the delivery person travels to each of the ten locations, the AR delivery platform may automatically preload (e.g., on the user device) the delivery instructions, with the augmented reality information, for each location as the user device approaches each location.

In some implementations, the user device may map the information indicating that the user device is at the location with the delivery information associated with the location (e.g., provided in the data structure). In such implementations, the user device may generate the delivery instructions, with the augmented reality information, based on the mapped delivery information (e.g., the delivery information provided by the user in FIG. 1B).

Figure 1D:
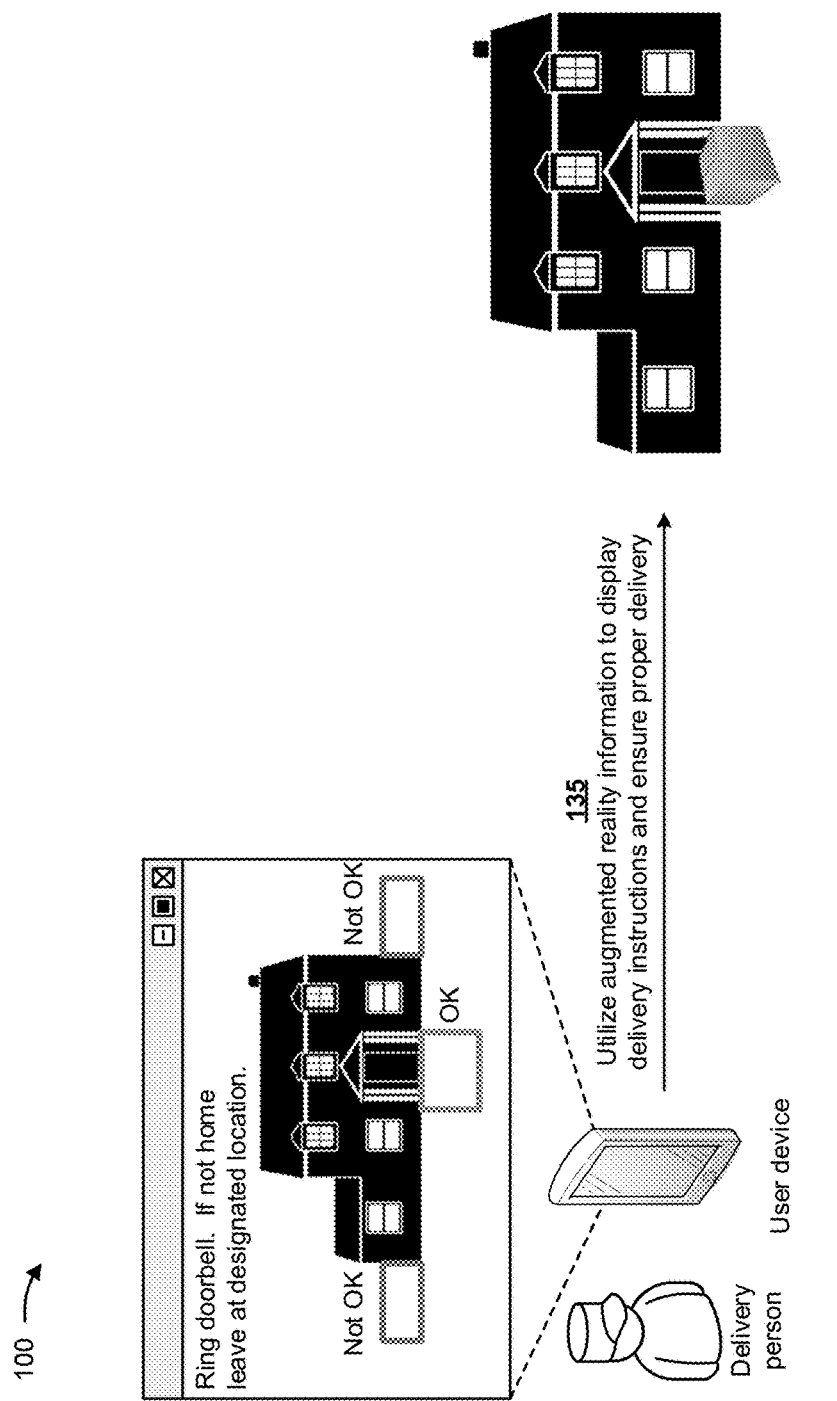

As shown in FIG. 1D, and by reference number 135, the user device associated with the delivery person may utilize the augmented reality information to display the delivery instructions for the package and ensure proper delivery of the package. For example, if the user device is smart glasses, the delivery person may wear the smart glasses and look at the location. The smart glasses may display the live location (e.g., the user's house), the delivery instructions (e.g., "Ring doorbell. If not home leave at designated location"), and the augmented reality information with the live location. The augmented reality information may include designated points or areas (e.g., red Not OK areas) to not deliver the package, and designated points or areas (e.g., green OK areas) to deliver the package in the live location. The delivery person may walk to the designated area (e.g., the green OK area) and may deliver the package at the designated area. In another example, if the user device is a mobile device, the delivery person may capture the live location with the mobile device, and the mobile device may display the live location, the delivery instructions, and the augmented reality information with the live location. The augmented reality information may include the designated points or areas (e.g., red Not OK areas) to not deliver the package, and the designated points or areas (e.g., green OK areas) to deliver the package in the live location. The delivery person may walk with the mobile device to the designated area (e.g., the green OK area) and may delivery the package at the designated area.

Figure 1E:
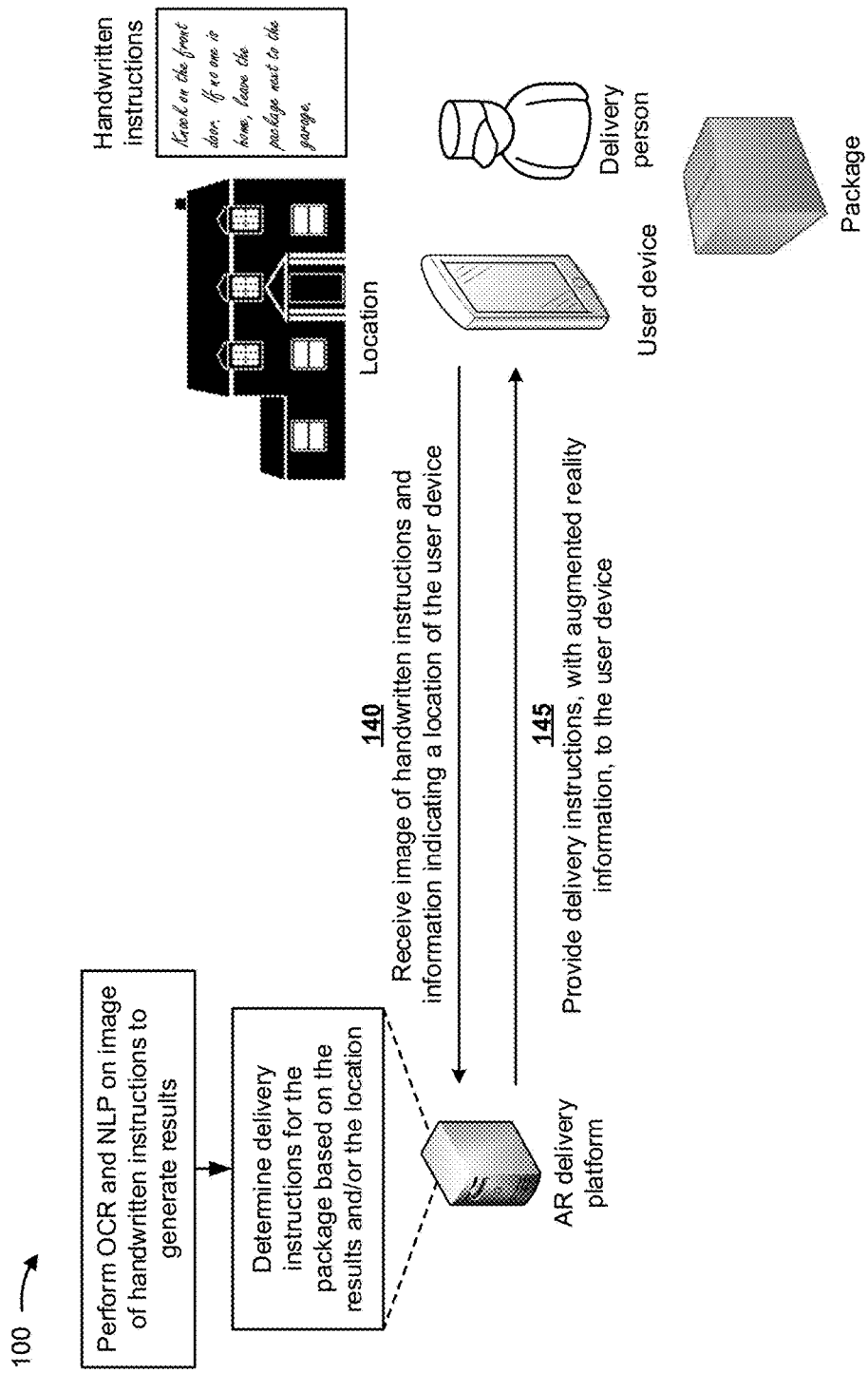

As shown in FIG. 1E, assume that the location includes handwritten instructions that the delivery person cannot understand, that the delivery person does not want to reference handwritten instructions each time at the location and does not remember the handwritten instructions, that the handwritten instructions are not noticeable by the delivery person by are captured by the user device, and/or the like. In such a situation, and as shown by reference number 140 in FIG. 1E, the AR delivery platform may receive, from the user device associated with the delivery person, an image of the handwritten instructions and information indicating a location of the user device. In some implementations, the AR delivery platform may perform optical character recognition (OCR) on the image to generate text of the handwritten instructions. In some implementations, the OCR may convert the image into an electronic format (e.g., the text). Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). Implementations of OCR may employ pattern recognition, artificial intelligence, computer vision, and/or the like.

In some implementations, the AR delivery platform may perform natural language processing (NLP) on the text, provided by the OCR, to generate results (e.g., a translation of the handwritten instructions, "Knock on the front door. If no one is home, leave the package next to the garage."). For example, the AR delivery platform may apply natural language processing to interpret the text and generate additional information associated with the potential meaning of information within the text. Natural language processing involves techniques performed (e.g., by a computer system) to analyze, understand, and derive meaning from human language in a useful way. Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

In some implementations, the AR delivery platform may determine delivery instructions for the package based on the results of the OCR and the natural language processing and based on the location. For example, the AR delivery platform may map the information indicating the location of the user device with the delivery information associated with the location, and may generate the delivery instructions based on the mapped delivery information (e.g., the delivery information provided by the user in FIG. 1B). In some implementations, the delivery instructions may include augmented reality information, the image of the location, information indicating preferred delivery times to the location, information indicating specific delivery instructions, the indications that identify one or more designated points for delivering an item at the location, and/or the like. In some implementations, the delivery instructions may be altered based on the information determined from the handwritten instructions. For example, if the delivery instructions indicate that the package should be delivered to the front door and the handwritten instructions indicate that the package should be delivered next to a garage (e.g., "Knock on the front door. If no one is home, leave the package next to the garage."), the delivery instructions may be altered to indicate that the package should be delivered next to the garage. In such implementations, the AR delivery platform may alter the augmented reality information associated with the delivery to indicate delivery next to the garage.

In some implementations, the user device associated with the delivery person may perform the OCR and natural language processing on the handwritten instructions, and may alter the delivery instructions based on the results of the OCR and natural language processing. In some implementations, if the OCR and natural language processing fails to translate the handwritten instructions, the handwritten instructions may be manually translated.

As further shown in FIG. 1E, and by reference number 145, the AR delivery platform may provide the delivery instructions, with the augmented reality information, to the user device associated with the delivery person. The user device may receive the delivery instructions and the augmented reality information, and the delivery instructions and the augmented reality information may enable the delivery person to deliver the package to an appropriate point at the location.

Figure 1F:
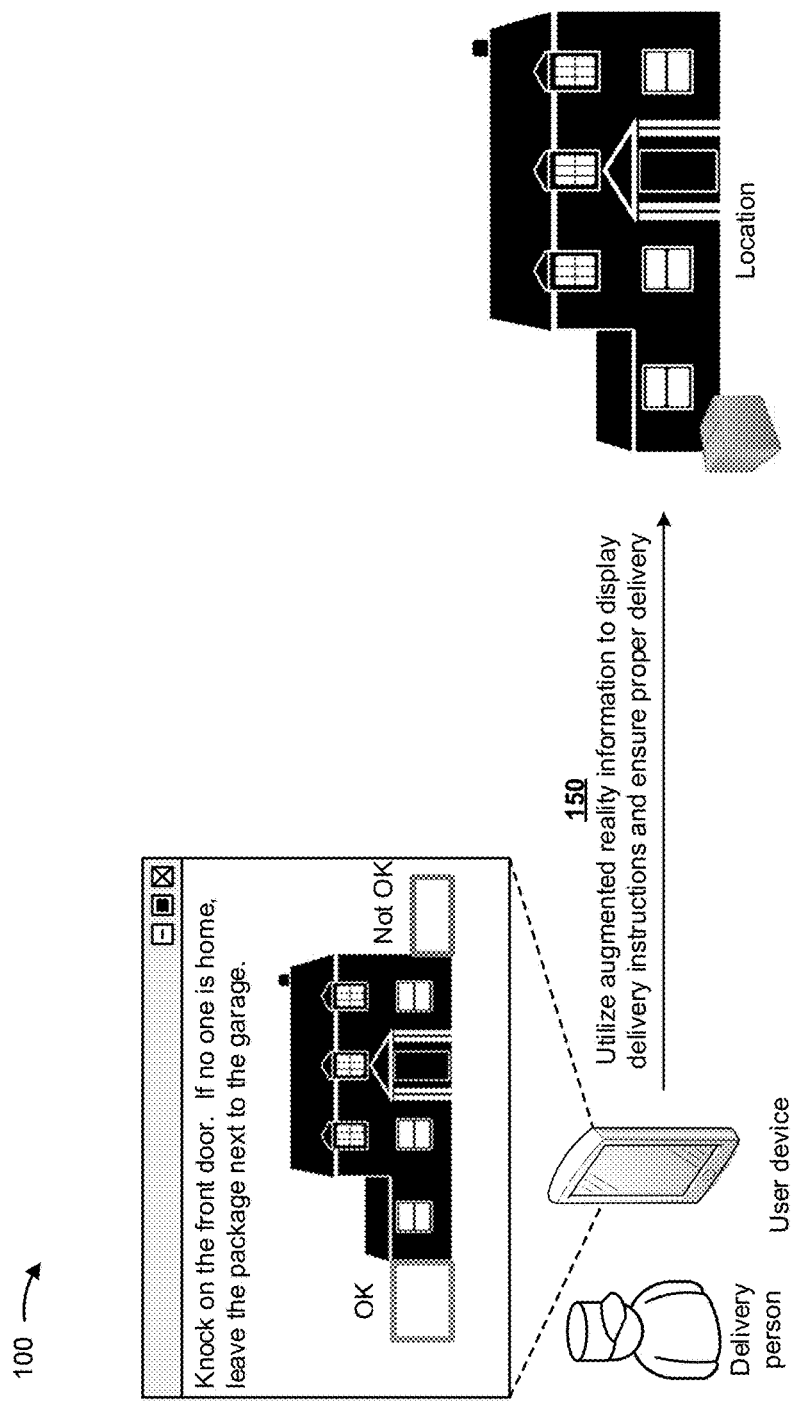

As shown in FIG. 1F, and by reference number 150, the user device associated with the delivery person may utilize the augmented reality information to display the delivery instructions for the package and ensure proper delivery of the package. For example, if the user device is smart glasses, the delivery person may wear the smart glasses and look at the location. The smart glasses may display the live location (e.g., the user's house), the delivery instructions (e.g., "Knock on the front door. If no one is home, leave the package next to the garage."), and the augmented reality information with the live location. The augmented reality information may include designated points or areas (e.g., red Not OK areas) to not deliver the package, and designated points or areas (e.g., green OK areas) to deliver the package in the live location. The delivery person may walk to the designated area (e.g., the green OK area) and may deliver the package at the designated area (e.g., next to the garage). In another example, if the user device is a mobile device, the delivery person may capture the live location with the mobile device, and the mobile device may display the live location, the delivery instructions, and the augmented reality information with the live location. The augmented reality information may include the designated points or areas (e.g., red Not OK areas) to not deliver the package, and the designated points or areas (e.g., green OK areas) to deliver the package in the live location. The delivery person may walk with the mobile device to the designated area (e.g., the green OK area) and may deliver the package at the designated area (e.g., next to the garage).

As shown in FIG. 1G, and by reference number 155, the AR delivery platform may receive images of a location over a period of time. In some implementations, the received images may indicate that the location has changed over the period of time. As further shown in FIG. 1G, and by reference number 160, the AR delivery platform may generate and train a machine learning model based on the images of the location over the period of time. In some implementations, the AR delivery platform may utilize the machine learning model (e.g., a pattern recognition model) to identify the patterns in the image of the location, to process the delivery information and the information indicating that the user device, associated with the delivery person, is at the location, to generate delivery instructions for the item, and/or the like.

In some implementations, the AR delivery platform may perform a training operation on the machine learning model with the images of the location over the period of time. For example, the AR delivery platform may separate the images of the location over the period of time into a training set, a validation set, a test set, and/or the like. In some implementations, the AR delivery platform may train the machine learning model using, for example, an unsupervised training procedure and based on the training set of the images of the location over the period of time. For example, the AR delivery platform may perform dimensionality reduction to reduce the images of the location over the period of time to a minimum feature set, thereby reducing resources (e.g., processing resources, memory resources, and/or the like) to train the machine learning model, and may apply a classification technique, to the minimum feature set.

In some implementations, the AR delivery platform may use a logistic regression classification technique to determine a categorical outcome (e.g., that the images of the location over the period of time indicate changes to the location). Additionally, or alternatively, the AR delivery platform may use a naïve Bayesian classifier technique. In this case, the AR delivery platform may perform binary recursive partitioning to split the images of the location over the period of time into partitions and/or branches, and use the partitions and/or branches to perform predictions (e.g., that the images of the location over the period of time indicate changes to the location). Based on using recursive partitioning, the AR delivery platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the AR delivery platform may use a support vector machine (SVM) classifier technique to generate a non-linear boundary between data points in the training set. In this case, the non-linear boundary is used to classify test data into a particular class.

Additionally, or alternatively, the AR delivery platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the AR delivery platform may use one or more other model training techniques, such as a neural network technique, a latent semantic indexing technique, and/or the like. For example, the AR delivery platform may perform an artificial neural network processing technique (e.g., using a two-layer feedforward neural network architecture, a three-layer feedforward neural network architecture, and/or the like) to perform pattern recognition with regard to patterns of the images of the location over the period of time. In this case, using the artificial neural network processing technique may improve an accuracy of the trained machine learning model generated by the AR delivery platform by being more robust to noisy, imprecise, or incomplete data, and by enabling the AR delivery platform to detect patterns and/or trends undetectable to human analysts or systems using less complex techniques.

As further shown in FIG. 1G, and by reference number 165, the AR delivery platform may utilize the trained machine learning model to determine that a new garage has been added at the location. The AR delivery platform may also determine that packages are now delivered at the newly added garage. In some implementations, the AR delivery platform may alter delivery instructions for the location to indicate that packages are to be delivered at the newly added garage (e.g., rather than the front door).

Figure 1H:
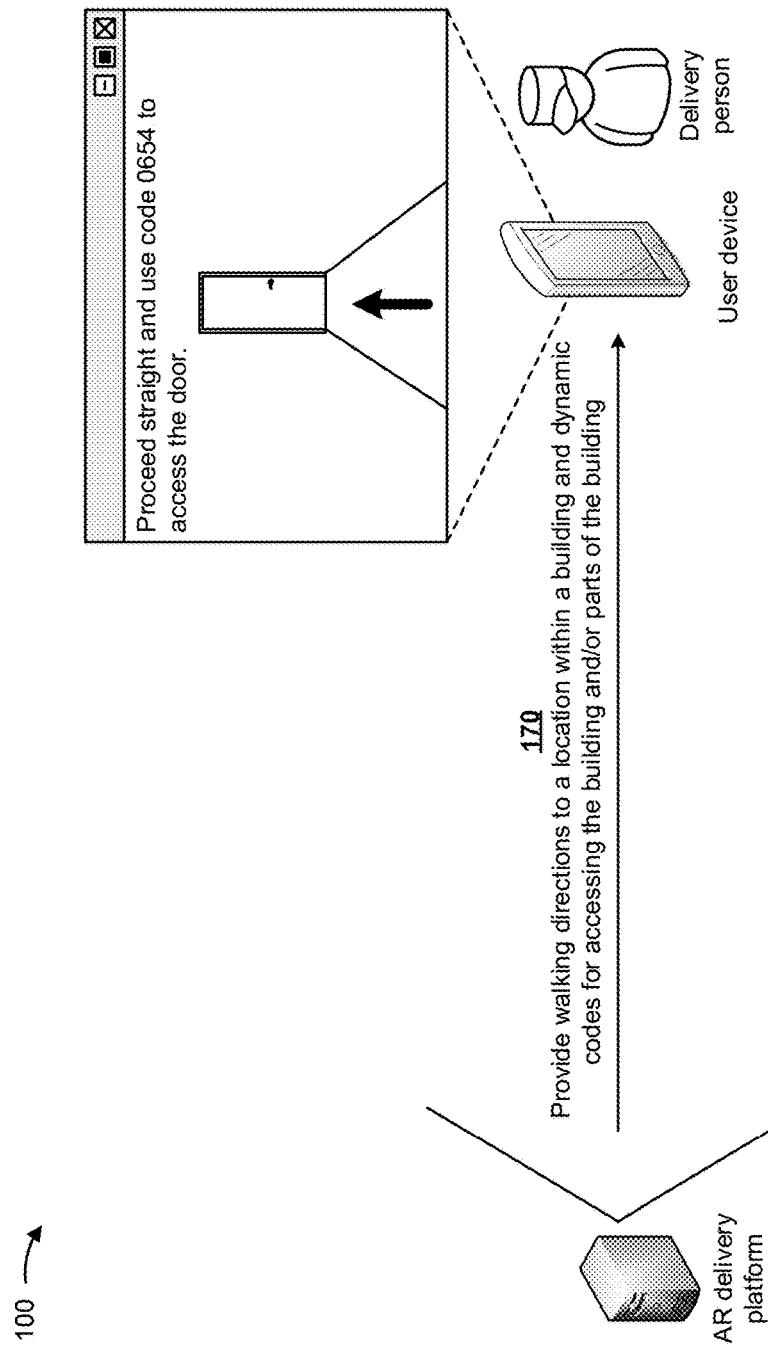

With reference to FIG. 1H, assume that the delivery person is to deliver an item to a location within a secure building (e.g., an office building). As shown in FIG. 1H, and by reference number 170, the AR delivery platform may provide, to the user device associated with the delivery person, delivery instructions that include walking directions to the location within the building and dynamic codes for accessing the building and/or parts of the building. For example, the delivery instructions may include augmented reality information indicating the walking directions (e.g., proceed straight, a straight arrow, and/or the like), the dynamic codes for accessing the building and/or parts of the building (e.g., use code 0654 to access the door), and/or the like. In some implementations, the codes may be dynamic in that they may only be used once and during the time the delivery person is within the building (e.g., to maintain security in the building). In this way, the AR delivery platform may provide augmented reality information that helps a delivery person to navigate a complex and secure building quickly and easily.

In this way, several different stages of the process for utilizing machine learning to generate augmented reality delivery instructions for delivering an item to a location are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes machine learning to generate augmented reality delivery instructions for delivering an item to a location. Finally, automating the process for utilizing machine learning to generate augmented reality delivery instructions for delivering an item to a location conserves computing resources (e.g., processing resources, memory resources, and/or the like) that would otherwise be wasted in attempting to provide delivery instructions for delivering an item to a location.

As indicated above, FIGS. 1A-1H are provided merely as examples. Other examples are possible and may differ from what was described with regard to FIGS. 1A-1H.

Figure 2:
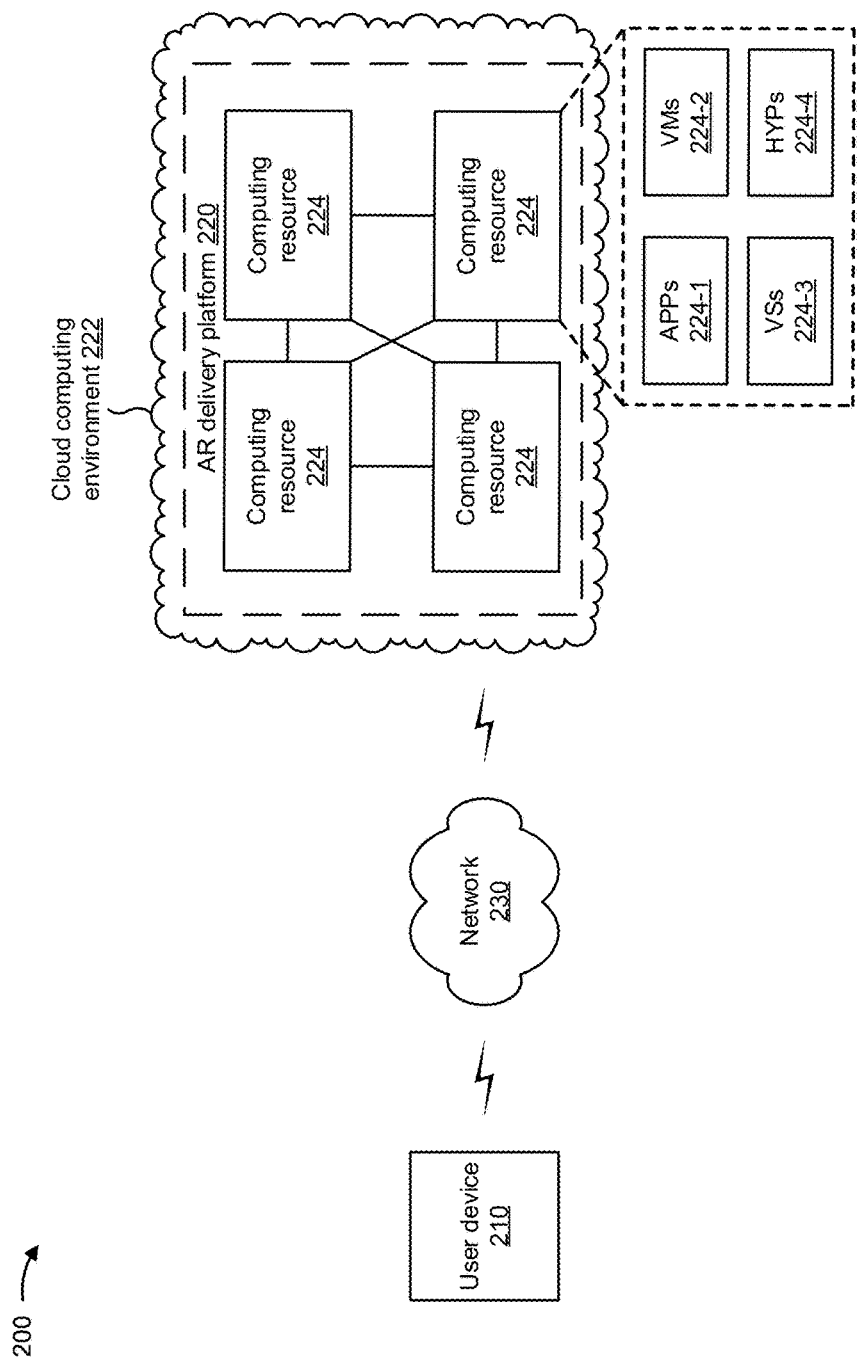
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an AR delivery platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to AR delivery platform 220.

AR delivery platform 220 includes one or more devices that utilize machine learning to generate augmented reality delivery instructions for delivering an item to a location. In some implementations, AR delivery platform 220 may be designed to be modular such that certain software components may be swapped in or out depending on a particular need. As such, AR delivery platform 220 may be easily and/or quickly reconfigured for different uses. In some implementations, AR delivery platform 220 may receive information from and/or transmit information to one or more user devices 210.

In some implementations, as shown, AR delivery platform 220 may be hosted in a cloud computing environment 222. Notably, while implementations described herein describe AR delivery platform 220 as being hosted in cloud computing environment 222, in some implementations, AR delivery platform 220 may not be cloud-based (i.e., may be implemented outside of a cloud computing environment) or may be partially cloud-based.

Cloud computing environment 222 includes an environment that hosts AR delivery platform 220. Cloud computing environment 222 may provide computation, software, data access, storage, etc. services that do not require end-user knowledge of a physical location and configuration of system(s) and/or device(s) that host AR delivery platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host AR delivery platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with AR delivery platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of AR delivery platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
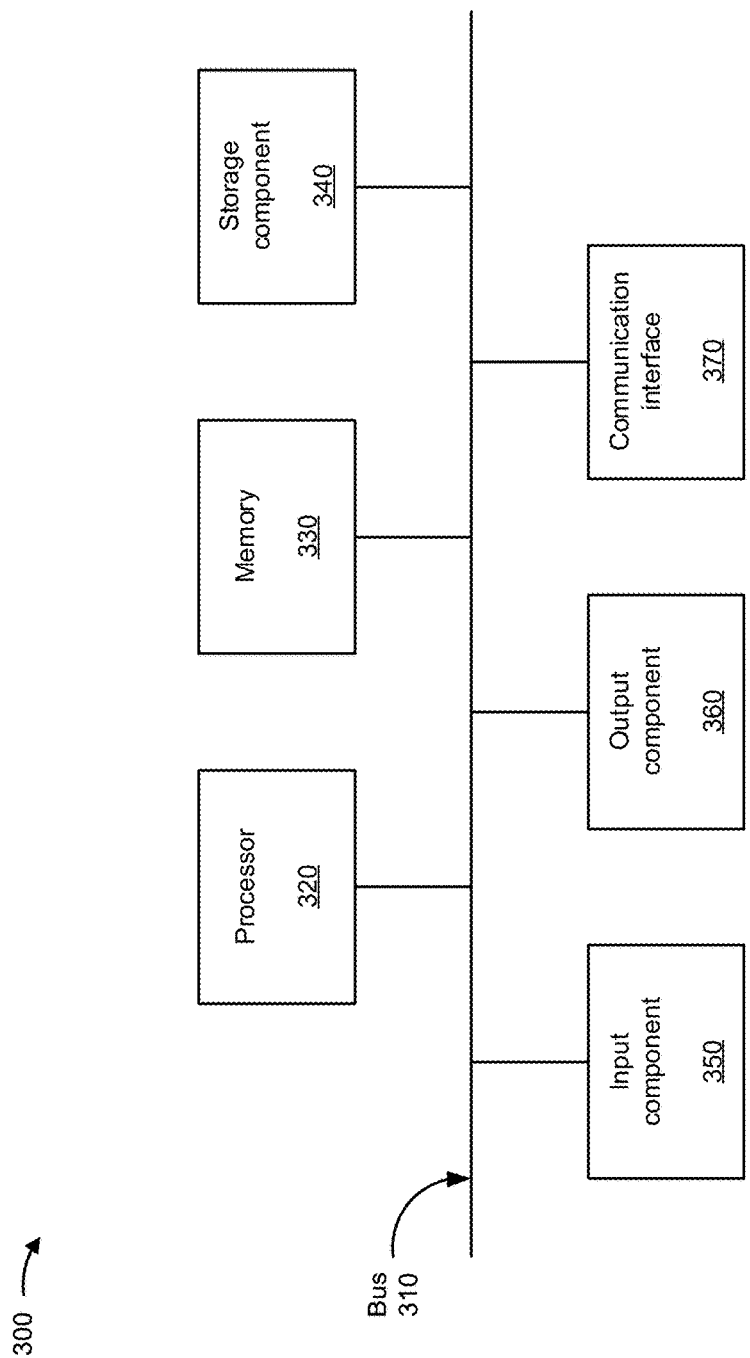
FIG. 3 is a diagram of example components of one or more devices of FIG. 2.

FIG. 3 is a diagram of example components of a device 300. Device 300 may correspond to user device 210, AR delivery platform 220, and/or computing resource 224. In some implementations, user device 210, AR delivery platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning to generate augmented reality delivery instructions for delivering an item to a location. In some implementations, one or more process blocks of FIG. 4 may be performed by an AR delivery platform (e.g., AR delivery platform 220). In some implementations, one or more process blocks of FIG. 4 may be performed by another device or a group of devices separate from or including AR delivery platform 220, such as user device 210.

As shown in FIG. 4, process 400 may include receiving delivery information indicating instructions for delivery of an item at a location, wherein the delivery information includes an image of the location with a designated point for delivering the item (block 410). For example, the AR delivery platform (e.g., using computing resource 224, processor 320, communication interface 370, and/or the like) may receive delivery information indicating instructions for delivery of an item at a location, as described above in connection with FIGS. 1A-2. In some implementations, the delivery information may include an image of the location with a designated point for delivering the item.

As further shown in FIG. 4, process 400 may include receiving information indicating that a user device, associated with a delivery person, is at the location (block 420). For example, the AR delivery platform (e.g., using computing resource 224, processor 320, memory 330, communication interface 370, and/or the like) may receive information indicating that a user device, associated with a delivery person, is at the location, as described above in connection with FIGS. 1A-2.

As further shown in FIG. 4, process 400 may include processing the delivery information and the information indicating that the user device, associated with the delivery person, is at the location, with a machine learning model, to generate delivery instructions for the item, wherein the delivery instructions include augmented reality information indicating the designated point for delivering the item at the location (block 430). For example, the AR delivery platform (e.g., using computing resource 224, processor 320, storage component 340, and/or the like) may process the delivery information and the information indicating that the user device, associated with the delivery person, is at the location, with a machine learning model, to generate delivery instructions for the item, as described above in connection with FIGS. 1A-2. In some implementations, the delivery instructions may include augmented reality information indicating the designated point for delivering the item at the location.

As further shown in FIG. 4, process 400 may include providing the delivery instructions to the user device, wherein the delivery instructions enable the user device to utilize the augmented reality information to display the designated point for delivering the item within a live image of the location (block 440). For example, the AR delivery platform (e.g., using computing resource 224, processor 320, memory 330, communication interface 370, and/or the like) may provide the delivery instructions to the user device, as described above in connection with FIGS. 1A-2. In some implementations, the delivery instructions may enable the user device to utilize the augmented reality information to display the designated point for delivering the item within a live image of the location.

Process 400 may include additional implementations, such as any single implementation or any combination of implementations described below and/or described with regard to any other process described herein.

In some implementations, the AR delivery platform may receive an image of handwritten instructions provided at the location, may perform image recognition on the image of the handwritten instructions to generate text, may perform natural language processing of the text to generate results, may generate additional delivery instructions for the item based on the results, and may provide the additional delivery instructions to the user device.

In some implementations, the AR delivery platform may receive images of the location over a period of time, may generate and train another machine learning model based on the images of the location over the period of time to produce a trained machine learning model, may generate additional delivery instructions for the item based on the trained machine learning model, and may provide the additional delivery instructions to the user device.

In some implementations, the location may include a building, and the AR delivery platform may generate additional delivery instructions that include walking directions to the designated point and one or more codes for accessing one or more portions of the building, and may provide the additional delivery instructions to the user device. In some implementations, when processing the delivery information, the AR delivery platform may match information identifying the location and the delivery information indicating instructions for delivery of the item at the location, and may generate the delivery instructions for the item based on matching the information identifying the location and the delivery information.

In some implementations, the AR delivery platform may receive additional delivery information indicating instructions for delivery of a plurality of items at a plurality of locations, may store the additional delivery information and the delivery information in a data structure, may compare information identifying the location with the additional delivery information and the delivery information stored in the data structure, and may identify the delivery information in the data structure based on comparing the information identifying the location with the additional delivery information and the delivery information stored in the data structure. In some implementations, when generating the delivery instructions for the item, the AR delivery platform may generate the delivery instructions for the item based on identifying the delivery information in the data structure.

In some implementations, the AR delivery platform may receive registration information for registering the location, and may create an account for the location based on the registration information. In some implementations, when receiving the delivery information indicating the instructions for delivery of the item at the location, the AR delivery platform may receive the delivery information via the account for the location.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing machine learning to generate augmented reality delivery instructions for delivering an item to a location. In some implementations, one or more process blocks of FIG. 5 may be performed by an AR delivery platform (e.g., AR delivery platform 220). In some implementations, one or more process blocks of FIG. 5 may be performed by another device or a group of devices separate from or including AR delivery platform 220, such as user device 210.

As shown in FIG. 5, process 500 may include receiving registration information for registering a user associated with a location (block 510). For example, the AR delivery platform (e.g., using computing resource 224, processor 320, communication interface 370, and/or the like) may receive registration information for registering a user associated with a location, as described above in connection with FIGS. 1A-2.

As further shown in FIG. 5, process 500 may include creating an account for the user based on the registration information (block 520). For example, the AR delivery platform (e.g., using computing resource 224, processor 320, storage component 340, and/or the like) may create an account for the user based on the registration information, as described above in connection with FIGS. 1A-2.

As further shown in FIG. 5, process 500 may include receiving, via the account, delivery information indicating instructions for delivery of an item at the location, wherein the delivery information includes an image of the location with a designated point for delivering the item (block 530). For example, the AR delivery platform (e.g., using computing resource 224, processor 320, memory 330, communication interface 370, and/or the like) may receive, via the account, delivery information indicating instructions for delivery of an item at the location, as described above in connection with FIGS. 1A-2. In some implementations, the delivery information may include an image of the location with a designated point for delivering the item.

As further shown in FIG. 5, process 500 may include determining that a user device, associated with a delivery person, is near the location to deliver the item, wherein the user device, associated with the delivery person, is determined to be near the location based on global positioning system (GPS) coordinates of the user device (block 540). For example, the AR delivery platform (e.g., using computing resource 224, processor 320, storage component 340, and/or the like) may determine that a user device, associated with a delivery person, is near the location to deliver the item, as described above in connection with FIGS. 1A-2. In some implementations, the user device, associated with the delivery person, may be determined to be near the location based on global positioning system (GPS) coordinates of the user device.

As further shown in FIG. 5, process 500 may include generating delivery instructions for the item based on the delivery information and based on determining that the user device, associated with the delivery person, is near the location, wherein the delivery instructions include augmented reality information indicating the designated point for delivering the item at the location (block 550). For example, the AR delivery platform (e.g., using computing resource 224, processor 320, memory 330, and/or the like) may generate delivery instructions for the item based on the delivery information and based on determining that the user device, associated with the delivery person, is near the location, as described above in connection with FIGS. 1A-2. In some implementations, the delivery instructions may include augmented reality information indicating the designated point for delivering the item at the location.

As further shown in FIG. 5, process 500 may include providing the delivery instructions to the user device associated with the delivery person, wherein the delivery instructions enable the user device, associated with the delivery person, to utilize the augmented reality information to display the designated point for delivering the item within a live image of the location (block 560). For example, the AR delivery platform (e.g., using computing resource 224, processor 320, memory 330, communication interface 370, and/or the like) may provide the delivery instructions to the user device associated with the delivery person, as described above in connection with FIGS. 1A-2. In some implementations, the delivery instructions may enable the user device, associated with the delivery person, to utilize the augmented reality information to display the designated point for delivering the item within a live image of the location.

Process 500 may include additional implementations, such as any single implementation or any combination of implementations described below and/or described with regard to any other process described herein.

In some implementations, the AR delivery platform may receive additional delivery information indicating instructions for delivery of a plurality of items at a plurality of locations, may store the additional delivery information and the delivery information in a data structure, may compare the GPS coordinates of the user device with the additional delivery information and the delivery information stored in the data structure, and may identify the delivery information in the data structure based on comparing the GPS coordinates of the user device with the additional delivery information and the delivery information stored in the data structure. In some implementations, the AR delivery platform, when generating the delivery instructions for the item, may generate the delivery instructions for the item based on identifying the delivery information in the data structure.

In some implementations, the user device, associated with the delivery person, may include a tablet computer, a mobile device, or smart glasses. In some implementations, the AR delivery platform may receive images of the location over a period of time, and may generate and train a machine learning model based on the images of the location over the period of time to produce a trained machine learning model. In some implementations, when generating the delivery instructions for the item, the AR delivery platform may generate the delivery instructions for the item based on the trained machine learning model.

In some implementations, the AR delivery platform may receive an image of handwritten instructions provided at the location, may perform image recognition on the image of the handwritten instructions to generate text, and may perform natural language processing of the text to generate results. In some implementations, when generating the delivery instructions for the item, the AR delivery platform may generate the delivery instructions for the item based on the results of the natural language processing of the handwritten instructions.

In some implementations, the location may include a building, and the AR delivery platform may generate additional delivery instructions that include walking directions to the designated point and one or more codes for accessing one or more portions of the building, and may provide the additional delivery instructions to the user device. In some implementations, when generating the delivery instructions for the item, the AR delivery platform may match the GPS coordinates of the user device and the delivery information indicating instructions for delivery of the item at the location, and may generate the delivery instructions for the item based on matching the GPS coordinates of the user device and the delivery information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning to generate augmented reality delivery instructions for delivering an item to a location. In some implementations, one or more process blocks of FIG. 6 may be performed by an AR delivery platform (e.g., AR delivery platform 220). In some implementations, one or more process blocks of FIG. 6 may be performed by another device or a group of devices separate from or including AR delivery platform 220, such as user device 210.

As shown in FIG. 6, process 600 may include receiving delivery information indicating instructions for delivery of an item at a location, wherein the delivery information includes an image of the location with a designated point for delivering the item (block 610). For example, the AR delivery platform (e.g., using computing resource 224, processor 320, communication interface 370, and/or the like) may receive delivery information indicating instructions for delivery of an item at a location, as described above in connection with FIGS. 1A-2. In some implementations, the delivery information may include an image of the location with a designated point for delivering the item.

As further shown in FIG. 6, process 600 may include receiving information indicating that a user device, associated with a delivery person, will be delivering the item to the location at a particular time (block 620). For example, the AR delivery platform (e.g., using computing resource 224, processor 320, storage component 340, communication interface 370, and/or the like) may receive information indicating that a user device, associated with a delivery person, will be delivering the item to the location at a particular time, as described above in connection with FIGS. 1A-2.

As further shown in FIG. 6, process 600 may include generating delivery instructions for the item based on the delivery information and the information indicating that the user device, associated with the delivery person, will be delivering the item to the location at the particular time, wherein the delivery instructions include augmented reality information indicating the designated point for delivering the item at the location (block 630). For example, the AR delivery platform (e.g., using computing resource 224, processor 320, memory 330, and/or the like) may generate delivery instructions for the item based on the delivery information and the information indicating that the user device, associated with the delivery person, will be delivering the item to the location at the particular time, as described above in connection with FIGS. 1A-2. In some implementations, the delivery instructions may include augmented reality information indicating the designated point for delivering the item at the location.

As further shown in FIG. 6, process 600 may include providing the delivery instructions to the user device, associated with the delivery person, prior to the particular time, wherein the delivery instructions enable the user device to utilize the augmented reality information to display the designated point for delivering the item within a live image of the location and at the particular time (block 640). For example, the AR delivery platform (e.g., using computing resource 224, processor 320, memory 330, communication interface 370, and/or the like) may provide the delivery instructions to the user device, associated with the delivery person, prior to the particular time, as described above in connection with FIGS. 1A-2. In some implementations, the delivery instructions may enable the user device to utilize the augmented reality information to display the designated point for delivering the item within a live image of the location and at the particular time.

Process 600 may include additional implementations, such as any single implementation or any combination of implementations described below and/or described with regard to any other process described herein.

In some implementations, the AR delivery platform may receive an image of handwritten instructions provided at the location, may perform image recognition on the image of the handwritten instructions to generate text, may perform natural language processing of the text to generate results, may generate additional delivery instructions for the item based on the results, and may provide the additional delivery instructions to the user device associated with the delivery person. In some implementations, the delivery instructions may enable the user device to utilize the augmented reality information to display the designated point for delivering the item within the live image of the location when the user device is located at the location.

In some implementations, the AR delivery platform may receive images of the location over a period of time, and may generate and train a machine learning model based on the images of the location over the period of time to produce a trained machine learning model. In some implementations, when generating the delivery instructions for the item, the AR delivery platform may generate the delivery instructions for the item based on information generated by the trained machine learning model.

In some implementations, the AR delivery platform may receive additional delivery information indicating instructions for delivery of a plurality of items at a plurality of locations, may store the additional delivery information and the delivery information in a data structure, may compare the information indicating that the user device, associated with the delivery person, will be delivering the item to the location with the additional delivery information and the delivery information stored in the data structure, and may identify the delivery information in the data structure based on comparing the information indicating that the user device, associated with the delivery person, will be delivering the item to the location with the additional delivery information and the delivery information stored in the data structure. In some implementations, when generating the delivery instructions for the item, the AR delivery platform may generate the delivery instructions for the item based on identifying the delivery information in the data structure.

In some implementations, the AR delivery platform may receive registration information for registering a user associated with the location, and may create an account for the user based on the registration information. In some implementations, when receiving the delivery information indicating the instructions for delivery of the item at the location, the AR delivery platform may receive the delivery information via the account for the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive delivery information indicating instructions for delivery of an item at a location;
   receive images of the location that were captured at different times;
   train a machine learning model, based on the images of the location that were captured at different times, to produce a trained machine learning model;
   determine that a physical attribute of the location has changed over a period of time based on the trained machine learning model;
   automatically select, using a pattern recognition model of the trained machine learning model, a designated point for delivering the item at the location based on the physical attribute of the location that changed;
   generate delivery instructions for the item based on the delivery information and the designated point for delivering the item; and
   provide the delivery instructions to a mobile device associated with a delivery service.

2. The device of claim 1, wherein the delivery instructions include augmented reality information indicating the designated point for delivering the item at the location.

3. The device of claim 1, wherein the one or more processors are to:
receive information indicating that the mobile device, associated with the delivery service, is at the location,
wherein the delivery instructions are provided to the mobile device, associated with the delivery service, based on the information indicating that the mobile device, associated with the delivery service, is at the location.

4. The device of claim 1, wherein the one or more processors, when training the machine learning model, are to:
perform dimensionality reduction to reduce the images of the location to a feature set of images; and
train the machine learning model using the feature set of images.

5. The device of claim 4, wherein the one or more processors are further to:
apply a classification technique to the feature set of images, the classification technique including:
a logistic regression classification technique,
a naïve Bayesian classifier technique,
binary recursive partitioning, or
a support vector machine (SVM) classifier technique.

6. The device of claim 1, wherein at least one of the images of the location are received from a mobile device associated with a person at the location.

7. The device of claim 1, wherein the one or more processors are further to:
receive registration information for registering the location; and
create an account for the location based on the registration information,
wherein, when receiving the delivery information indicating the instructions for delivery of the item at the location, the one or more processors are to:
receive the delivery information via the account for the location.

8. A method, comprising:
receiving, by a device, delivery information indicating instructions for delivery of an item at a location;
receiving, by the device, images of the location that were captured at different times;
training, by the device, a machine learning model, based on the images of the location that were captured at different times, to produce a trained machine learning model;
determining, by the device, that a physical attribute of the location has changed over a period of time based on the trained machine learning model;
automatically selecting, by the device and using a pattern recognition model of the trained machine learning model, a designated point for delivering the item at the location based on the physical attribute of the location that changed;
generating, by the device, delivery instructions for the item based on the delivery information and the designated point for delivering the item; and
providing, by the device, the delivery instructions to a mobile device associated with a delivery service.

9. The method of claim 8, wherein the delivery instructions include augmented reality information indicating the designated point for delivering the item at the location.

10. The method of claim 8, further comprising
receiving information indicating that the mobile device, associated with the delivery service, is at the location,
wherein the delivery instructions are provided to the mobile device, associated with the delivery service, based on the information indicating that the mobile device, associated with the delivery service, is at the location.

11. The method of claim 8, wherein training the machine learning model includes:
performing dimensionality reduction to reduce the images of the location to a feature set of images; and
training the machine learning model using the feature set of images.

12. The method of claim 11, further comprising:
applying a classification technique to the feature set of images, the classification technique including:
a logistic regression classification technique,
a naïve Bayesian classifier technique,
binary recursive partitioning, or
a support vector machine (SVM) classifier technique.

13. The method of claim 8, wherein at least one of the images of the location are received from a mobile device associated with a person at the location.

14. The method of claim 8, further comprising:
receiving registration information for registering the location; and
creating an account for the location based on the registration information,
wherein receiving the delivery information indicating the instructions for delivery of the item at the location includes:
receiving the delivery information via the account for the location.

15. A non-transitory computer-readable medium storing instructions, the instructions comprising:
one or more instructions that, when executed by one or more processors, cause the one or more processors to:
receive delivery information indicating instructions for delivery of an item at a location;
receive images of the location that were captured at different times;
train a machine learning model, based on the images of the location that were captured at different times, to produce a trained machine learning model;
determine that a physical attribute of the location has changed over a period of time based on the trained machine learning model;
automatically select, using a pattern recognition model of the trained machine learning model, a designated point for delivering the item at the location based on the physical attribute of the location that changed;
generate delivery instructions for the item based on the delivery information and the designated point for delivering the item; and
provide the delivery instructions to a mobile device associated with a delivery service.

16. The non-transitory computer-readable medium of claim 15, wherein the delivery instructions include augmented reality information indicating the designated point for delivering the item at the location.

17. The non-transitory computer-readable medium of claim 15, wherein the one or more instructions, when executed by the one or more processors, further cause the one or more processors to:
receive information indicating that the mobile device, associated with the delivery service, is at the location,
wherein the delivery instructions are provided to the mobile device, associated with the delivery service, based on the information indicating that the mobile device, associated with the delivery service, is at the location.

18. The non-transitory computer-readable medium of claim 15, wherein the one or more instructions, that cause the one or more processors to train the machine learning model, cause the one or more processors to:
perform dimensionality reduction to reduce the images of the location to a feature set of images; and
train the machine learning model using the feature set of images.

19. The non-transitory computer-readable medium of claim 18, wherein the one or more instructions, when executed by the one or more processors, further cause the one or more processors to:
apply a classification technique to the feature set of images, the classification technique including:
a logistic regression classification technique,
a naïve Bayesian classifier technique,
binary recursive partitioning, or
a support vector machine (SVM) classifier technique.

20. The non-transitory computer-readable medium of claim 15, wherein at least one of the images of the location are received from a mobile device associated with a person at the location.

* * * * *